Aug. 27, 1963   A. H. WILLIAMS   3,101,655
BOX MAKING MACHINES
Filed Dec. 22, 1960   9 Sheets-Sheet 1
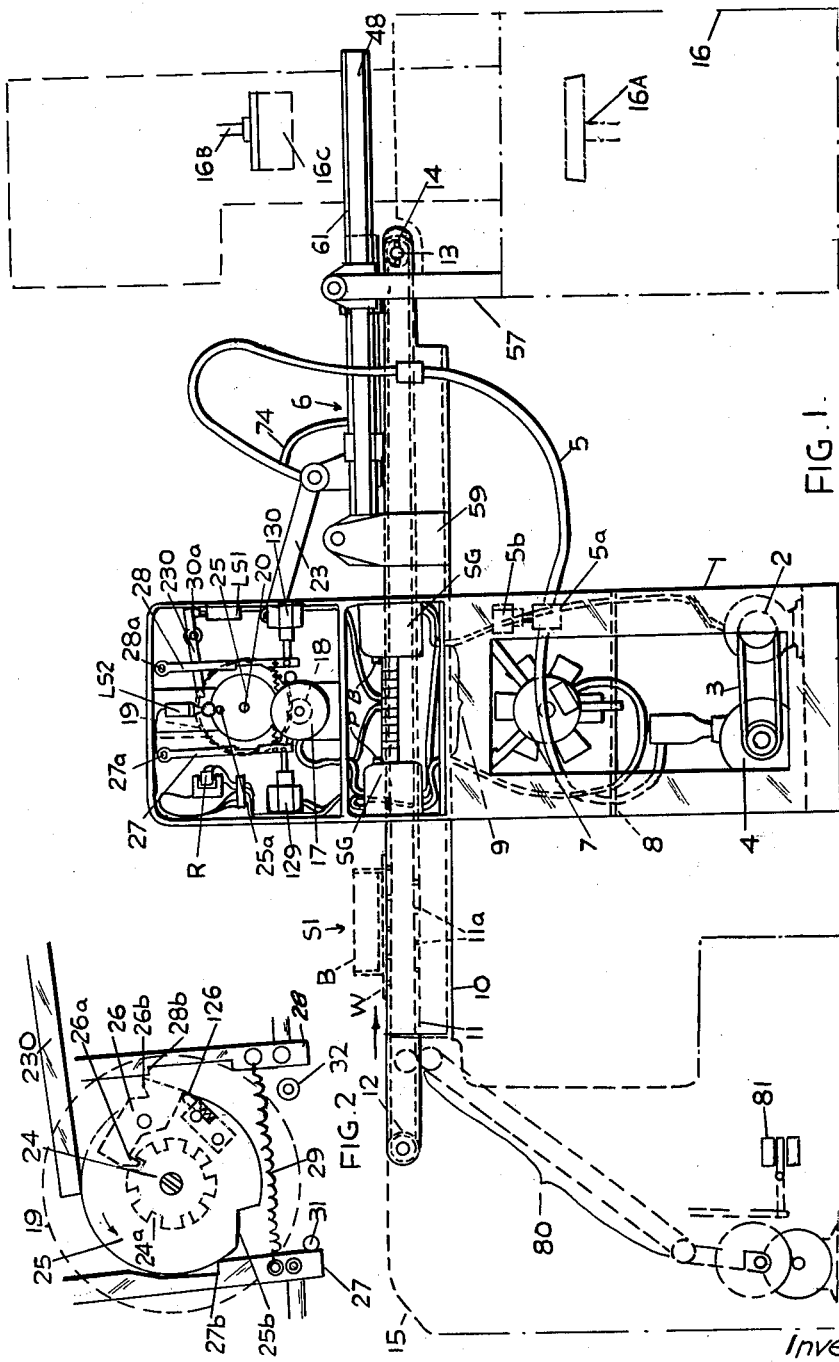
Inventor
ALBERT HENRY WILLIAMS
By Toulmin & Toulmin
Attorneys Aug. 27, 1963  A. H. WILLIAMS  3,101,655
BOX MAKING MACHINES
Filed Dec. 22, 1960  9 Sheets-Sheet 2
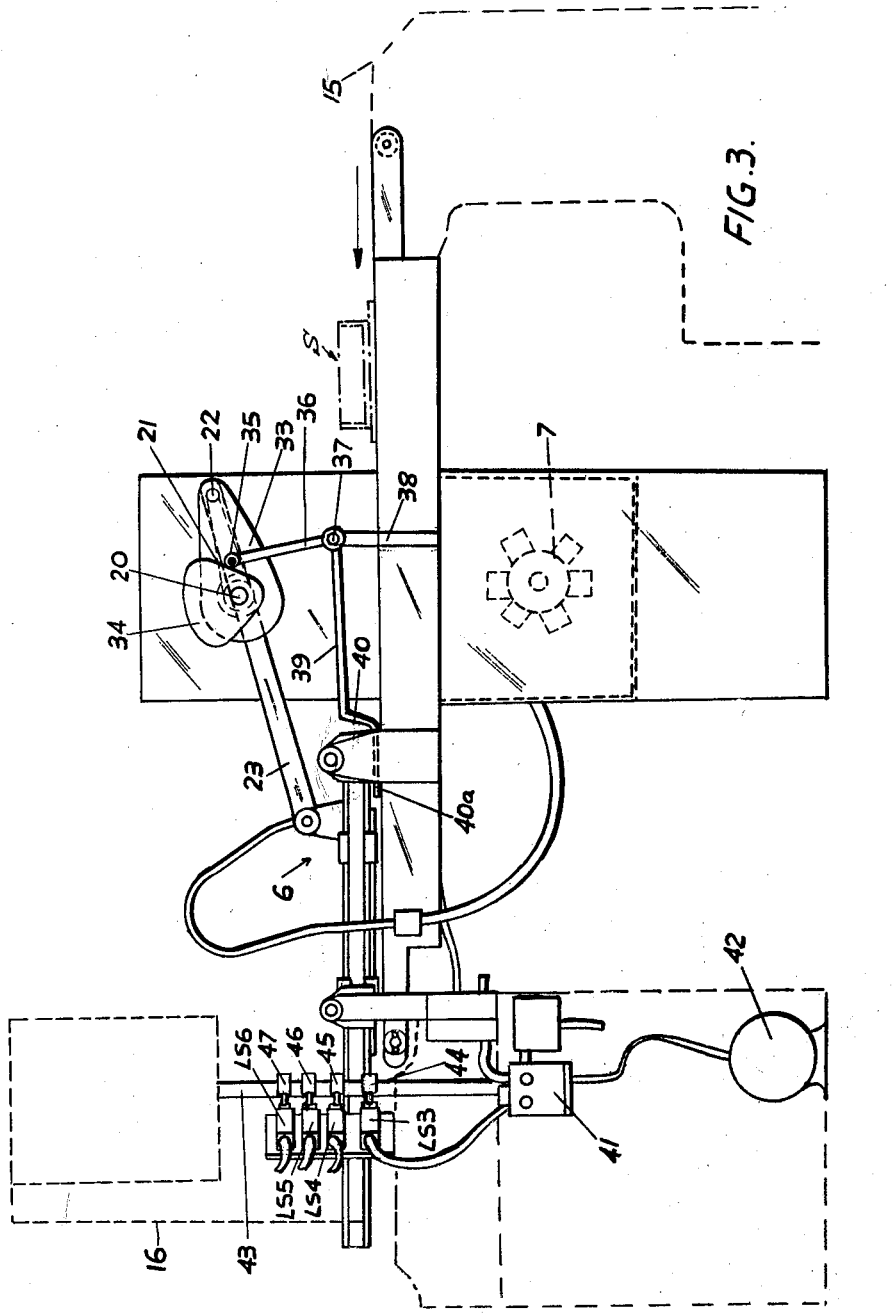
Inventor
ALBERT HENRY WILLIAMS
By Toulmin & Toulmin
Attorneys

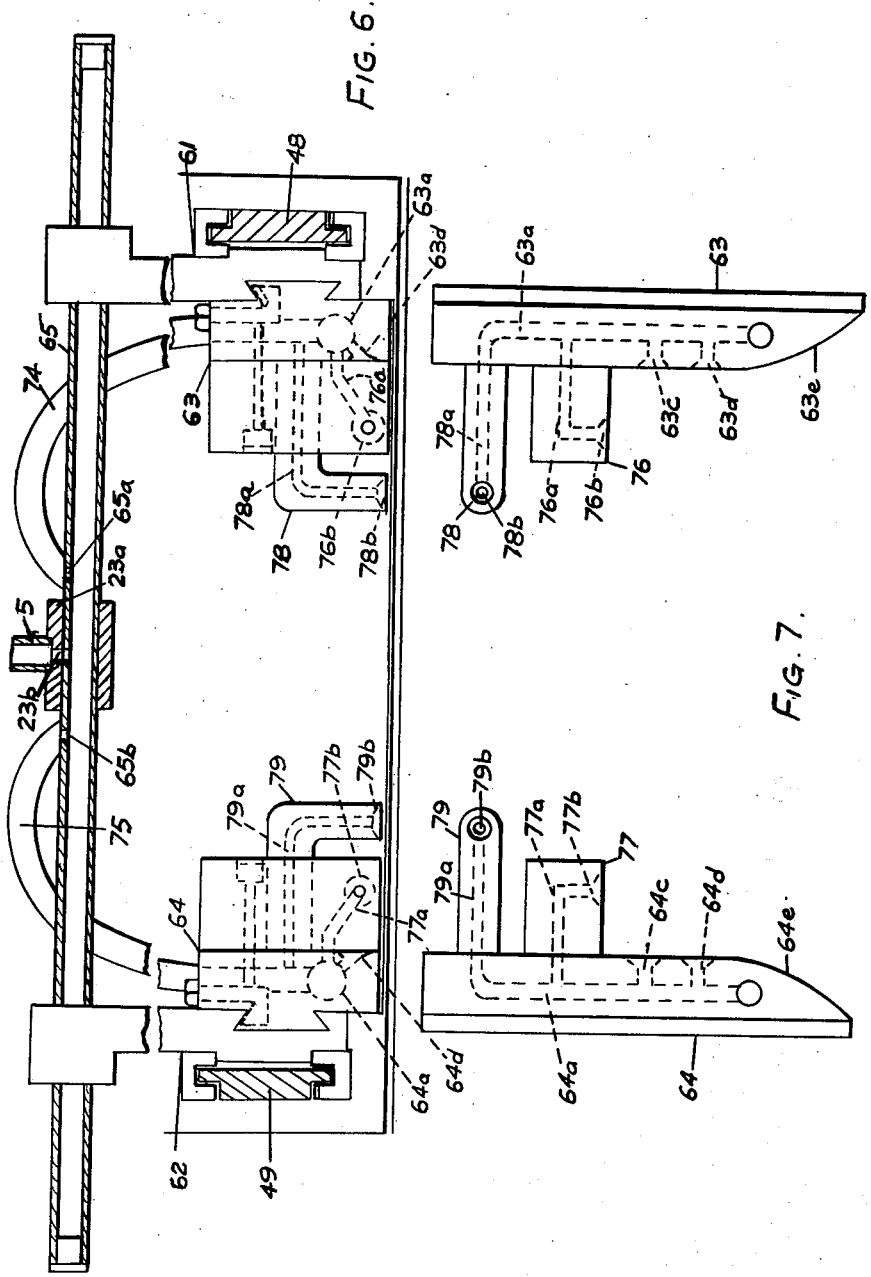

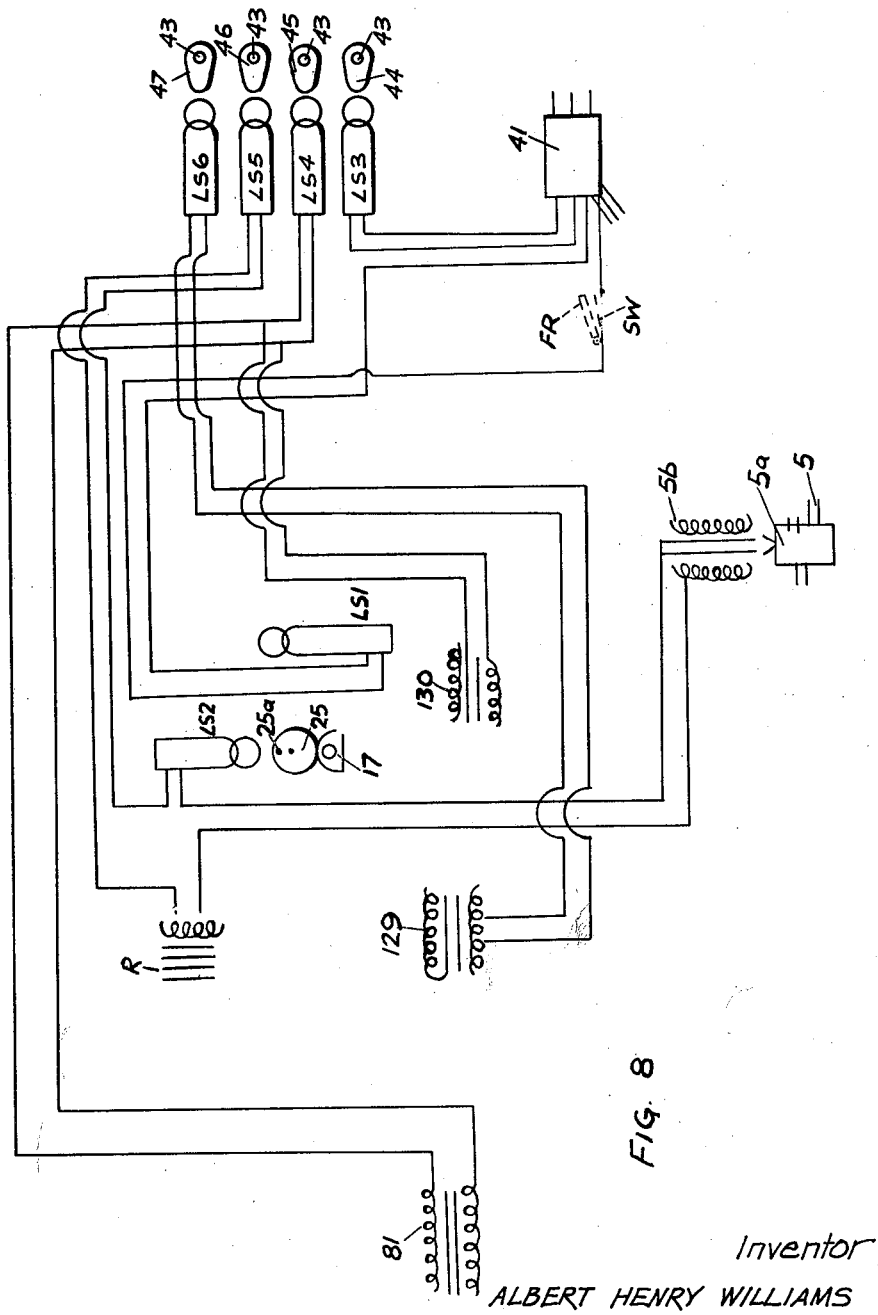

Aug. 27, 1963  A. H. WILLIAMS  3,101,655
BOX MAKING MACHINES
Filed Dec. 22, 1960  9 Sheets-Sheet 7

Inventor
ALBERT HENRY WILLIAMS

By Toulmin & Toulmin
Attorneys

Inventor
ALBERT HENRY WILLIAMS
By Toulmin & Toulmin
Attorneys

Inventor
ALBERT HENRY WILLIAMS
By Toulmin & Toulmin
Attorneys

United States Patent Office 3,101,655
Patented Aug. 27, 1963

3,101,655
BOX MAKING MACHINES
Albert Henry Williams, Nottingham, England, assignor to Caledex Machine Company Limited
Filed Dec. 22, 1960, Ser. No. 77,550
Claims priority, application Great Britain Dec. 28, 1959
11 Claims. (Cl. 93—54)

This invention is for improvements relating to box making apparatus and concerns the operation of conveying box assemblies, each consisting of a stayed box structure and partially applied sheet material, from a loading station whereat the box assemblies are formed, to a transfer station, and transferring the box assemblies from the transfer station to a wrapping station whereat the application of sheet material to the box assemblies is completed.

There have been many forms of apparatus in which this operation is carried out and which include a gumming machine for feeding sheets of material with gummed side uppermost to a conveyor by which the gummed sheets are intermittently conveyed to the loading station to have stayed box structures placed on them to form the box assemblies, and also by which the box assemblies are conveyed to the transfer station whereat transfer mechanism grasps the box assemblies and delivers them into the path of a form block which reciprocates in a wrapping machine at the wrapping station to carry the box assemblies past means to complete the wrapping.

However, in all these prior arrangements the conveyor and transfer mechanism is related with the wrapping machine in such manner as to be unsuitable for use with at least certain other separate wrapping machines, and consequently if the users of these separate wrapping machines require conveyor and transfer mechanisms they must heretofore bear the undesirable expense of employing the complete conveyor, transfer, and wrapping apparatus separate from their own wrapping machines.

An object of the invention is to provide conveyor and transfer mechanism in such improved manner that it is readily capable of use with any of a variety of different wrapping machines.

The invention provides apparatus for feeding into the path of movement of a reciprocated form block, a box assembly consisting of a stayed box structure and partially applied sheet material in the flat, said apparatus comprising a conveyor mechanism adapted to carry the box assembly from a loading station whereat the box assembly is formed, to a transfer station, a transfer mechanism adapted to engage the box assembly at the transfer station and to carry it into it into a position off the conveyor, and means combining the conveyor and transfer mechanism to enable use of the apparatus in self-contained or built-in manner, with any machine which embodies said form block in a manner to receive the transfer mechanism with the box assembly presented thereby in the path of movement of the form block. Conveniently the transfer mechanism comprises a grasping device adapted for grasping the box assembly at the transfer station, and operating means therefor adapted to reciprocate the grasping device in a sequence of pushing the grasping device from the transfer station to said position off the conveyor and after releasing the grasp and having a dwell for operation of the form block, pulling the grasping device back to the transfer station. Conveniently also the movement of the box assembly between the transfer station and said position off the conveyor is in a direction longitudinally of the conveyor.

The transfer mechanism may comprise a pair of transfer members adapted for releasably grasping the box assembly between them and mounted in laterally spaced relationship for slidable displacement in planes longitudinally of the delivery end of the conveyor, and a reciprocation-and-dwell-producing drive mechanism arranged intermediate the ends of the conveyor mechanism and operably connected to the inner ends of the transfer members. There may be suction elements carried by the transfer mechanism for releasable grasping of the box assembly and means for controlling the suction from said elements. There may also be adjusting means in the transfer mechanism for grasping of different size box assemblies.

Displaceable stop means may be provided for moving into position behind an advanced box assembly to maintain the latter in the position at the transfer station while the transfer mechanism returns from the path of the form block.

Timing means are conveniently provided adapted to be operated by a moving part of a wrapping machine embodying the form block for controlling operation of the apparatus.

There may also be provided control means adapted for the conveyor to be intermittently driven in timed relation with the operation of a gumming machine which delivers the sheet material to the conveyor.

The apparatus may be under manual control of a foot pedal operated switch associated either with the combined conveyor and transfer mechanism or with the machine which embodies said form block.

The invention also provides combined conveyor and transfer apparatus for work to be conveyed and transferred to a machine adapted to operate on the work, comprising a conveyor, a pair of laterally spaced transfer members mounted for reciprocation along the delivery end of the conveyor, operating means for effecting the reciprocation of the transfer members between a transfer station and a position off the conveyor, and operating means for operating the transfer members to releasably grasp the work at the transfer station and release the work at said position off the conveyor.

The above and other features of the invention set out in the appended claims are incorporated in the constructions which will now be described as specific embodiment with reference to the drawings accompanying the provisional specification in which:

FIGURE 1 is a side view of combined conveyor and transfer apparatus according to the invention.

FIGURE 2 is an enlarged detail of clutch means in said apparatus.

FIGURE 3 is a view of the apparatus from the other side.

FIGURE 6 is an enlarged cross sectional view of the apparatus.

FIGURE 7 is a plan view of part of FIGURE 6.

FIGURE 8 is a diagrammatical illustration of an electric circuit.

Figure 9:
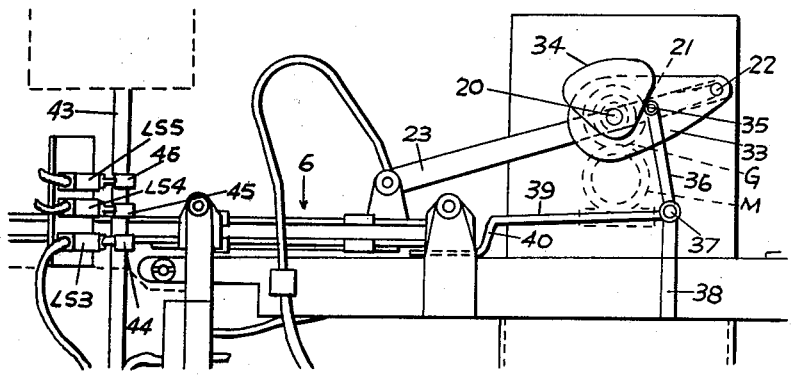

And with reference to the accompanying drawings in which:

FIGURE 9 is a similar view to part of FIGURE 3 showing a modification.

Figure 10:
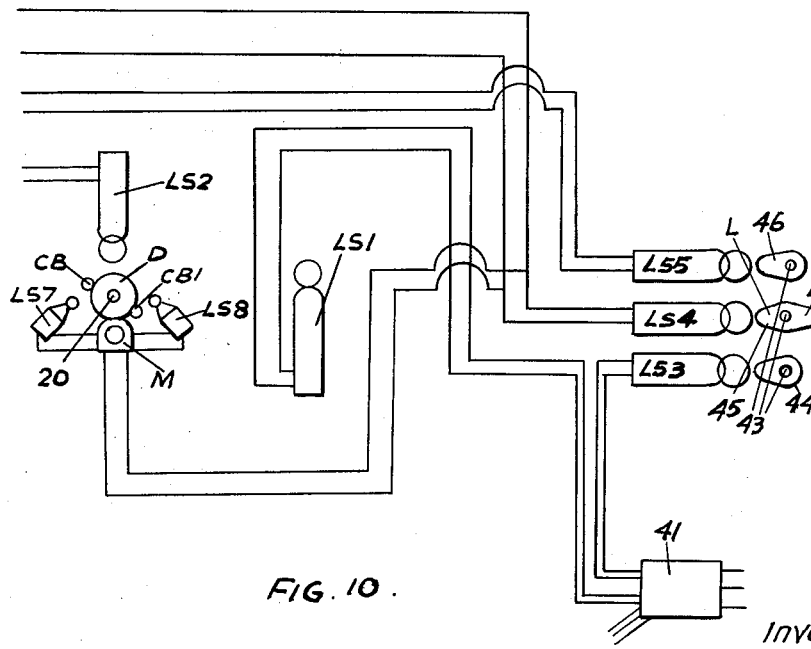

FIGURE 10 is a similar view of part of FIGURE 8 showing part of an electric circuit for said modification.

Figure 11:
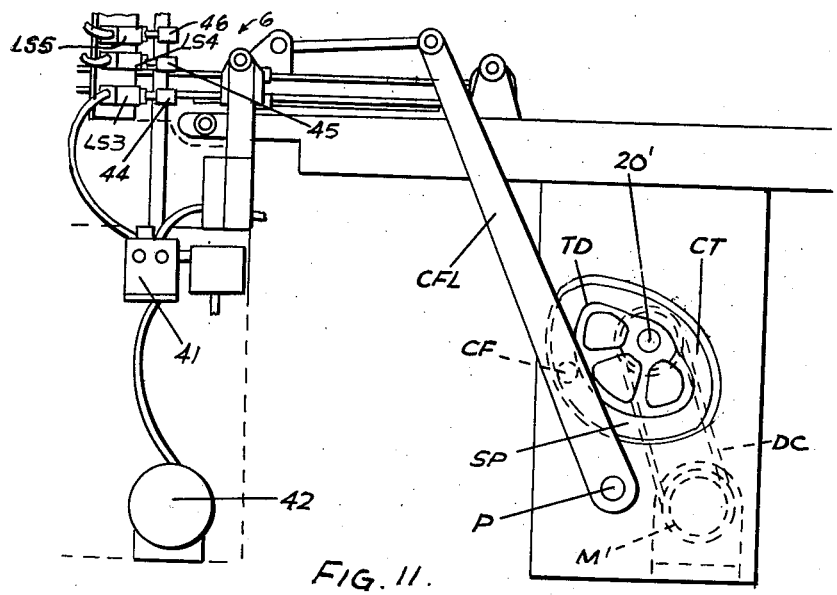

FIGURE 11 is another similar view to part of FIGURE 3 showing a further modification.

Figure 12:
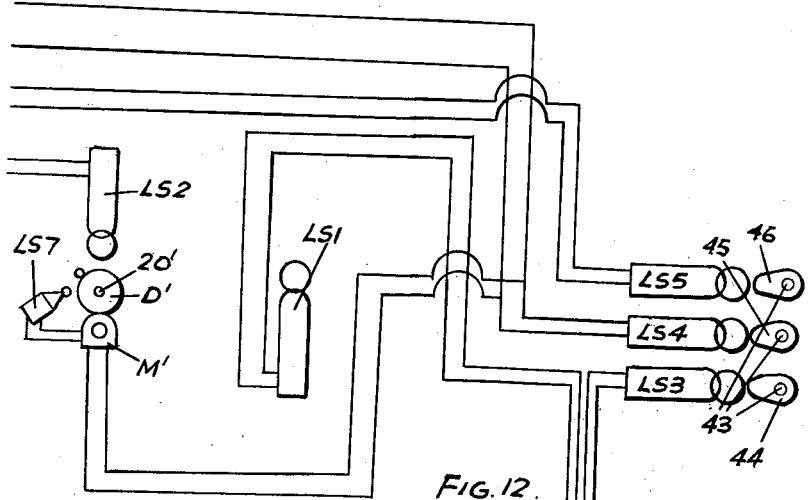

FIGURE 12 is a further similar view to part of FIGURE 8 showing part of an electric circuit for said further modification.

Figure 13:
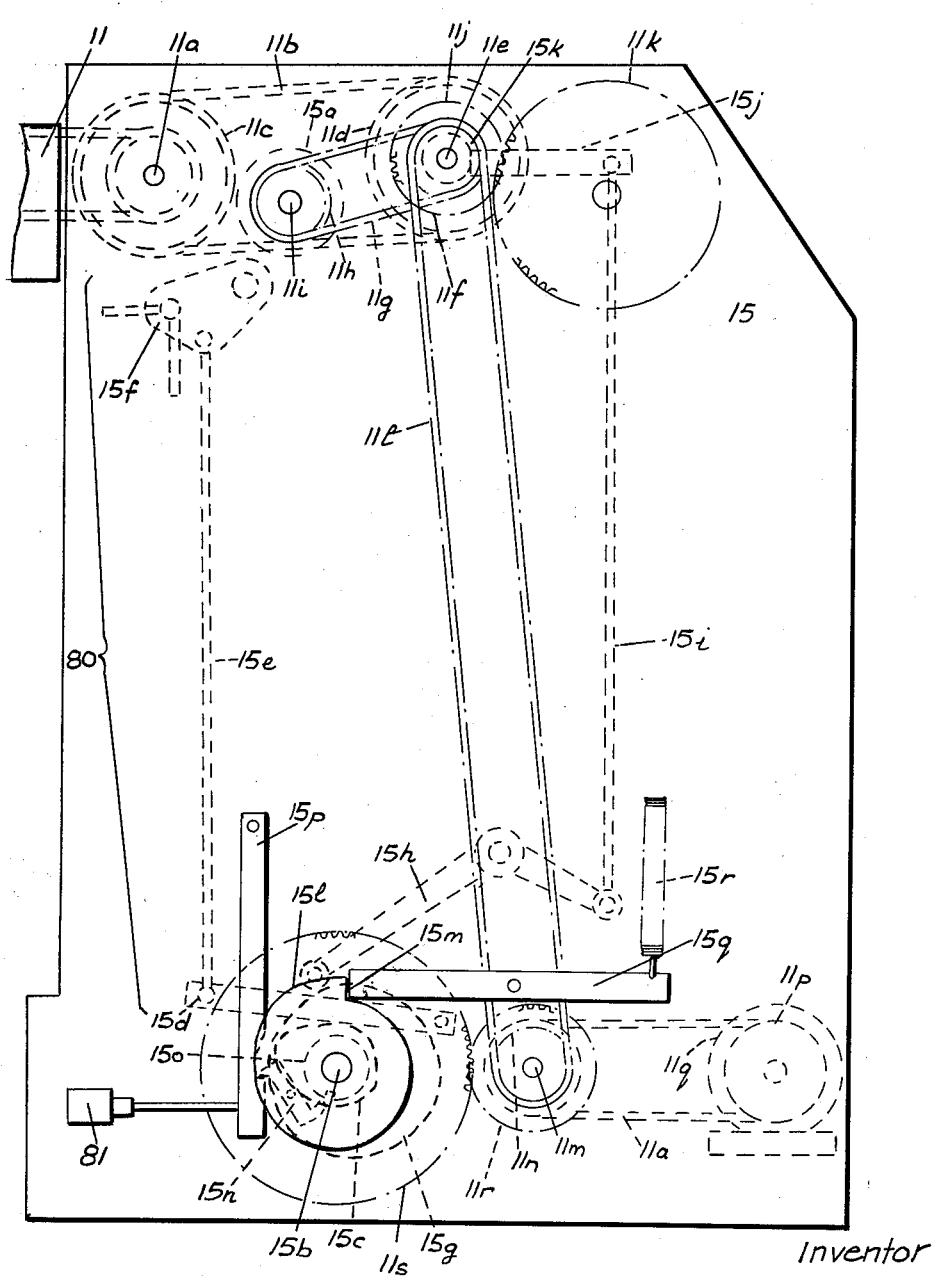

FIGURE 13 is an enlarged detail side view of a gumming machine for use with the apparatus.

Referring now to FIGURE 1 of the drawings the combined conveyor and transfer apparatus according to the invention is shown in full lines, and it is also shown in use with a gumming machine 15, indicated by broken lines, of any one of a variety of constructions, and with a wrapping machine 16, also indicated in broken lines, and also of any one of a variety of constructions.

In general the combined conveyor and transfer apparatus will be provided as a self contained unit capable of being operationally coupled to any of the gumming and wrapping machines although it is to be understood that the apparatus may be built in with either the gumming machine or the wrapping machine or with both these machines.

Hereinafter, the particular description will be given by way of example in relation to an arrangement wherein the combined conveyor and transfer apparatus is self-contained yet operably coupled to the gumming machine 15, and to the wrapping machine 16.

Figure 5:
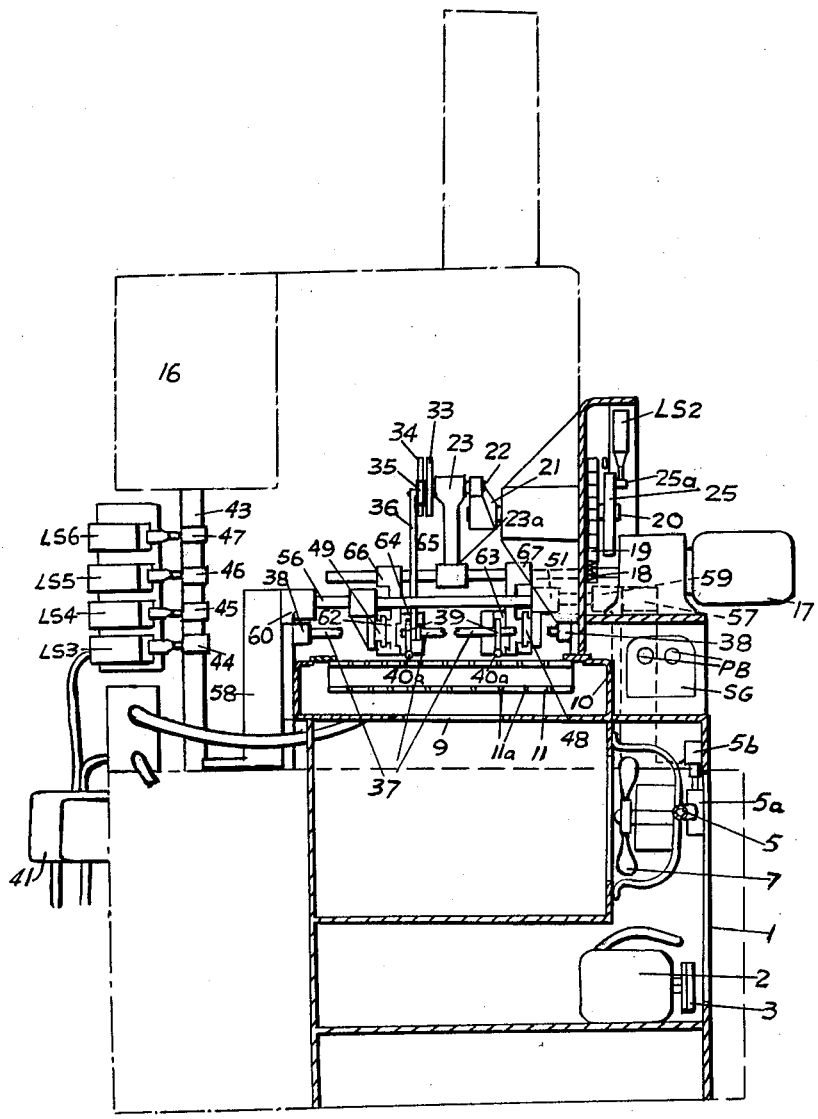
FIGURE 5 is a cross sectional view of the apparatus.

Referring now to FIGURES 1 and 5 the apparatus has a support casing 1 of upright box form and in its lower end there is an electric motor 2 driving through a belt 3 to a pump 4, the pump 4 being connected by an air pipe 5 to a transfer mechanism indicated generally at 6 and hereinafter to be fully described.

Also housed in the casing 1 there is an electric fan 7 for applying suction in a chamber of which the base is shown at 8, which chamber communicates by means of a hole 9 in the base of a channel 10, with the interior of this channel 10 in which there lies a conveyor 11 having perforations 11a.

The conveyor 11 runs on end rollers 12 and 13, the roller 13 being adjustable for tensioning the belt, as allowed by slots such as 14.

Also housed in the casing 1, at a higher level than the conveyor 11, there is an electric motor 17 driving a pinion 18 which meshes with a gear 19. The gear 19 is freely mounted on a crank axle 20 and secured on this crank axle 20 there is a crank arm 21 (see FIGURE 3) which has a crank pin 22 from which there extends a connecting rod 23 connected to the transfer mechanism 6.

There is further mounted on the axle 20 a notched clutch ring 24 (see FIGURE 2) having notches 24a and being screw connected to the gear wheel 19.

There is further secured on the crank axle 20 a disc plate 25 having pivotally mounted on it a clutch latch 26 formed with a nose 26a and a notch 26b.

The clutch latch 26 is biased to a position with the nose 26a engaged in a notch 42a, by a spring biased plunger 126 which is also mounted on the disc plate 25.

Co-operating with the clutch latch 26 there are two clutch control arms 27 and 28 at opposite sides of the disc plate 25 and pivoted at their upper ends at 27a, 28a (FIGURE 1).

Each clutch arm is formed with a shoulder 27b, 28b (FIGURE 2) and the two arms are interconnected by a tension spring 29, there being also provided stops 31 and 32 for limiting inward movement of the arms 27, 28. The arm 27 is connected to a solenoid 129 (FIGURE 1) and the arm 28 is connected to a solenoid 130.

There is further mounted in the casing 1 a check arm 230 pivoted at 30a and resting at one end on the disc plate 25 (FIGURE 2), and associated at its other end with a limit switch LS1.

The casing 1 also houses suitable switch gear SG (FIGURE 1) with press buttons PB and a relay R.

There is also a second limit switch LS2 which is operated by a peg 25a on the disc plate 25.

For control of suction in the pipe 5 there is an air valve 5a with which the pipe 5 communicates and this valve is controlled by a solenoid 5b.

Referring now to FIGURES 3 and 5 there is mounted on the crank pin 22, a substantially pear shaped plate 33 having a centre in line with the crank axle 20 and carrying on that centre a cam 34.

Engaging with the cam 34 there is a follower 35 on a follower arm 36 which is pivoted on a rod 37 which in turn is supported by brackets 38 from the channel 10.

Also secured to the rod 37 there is a pair of finger carrying arms 39 each having a downwardly cranked part 40 and a forward finger stop 40a.

Figure 4:
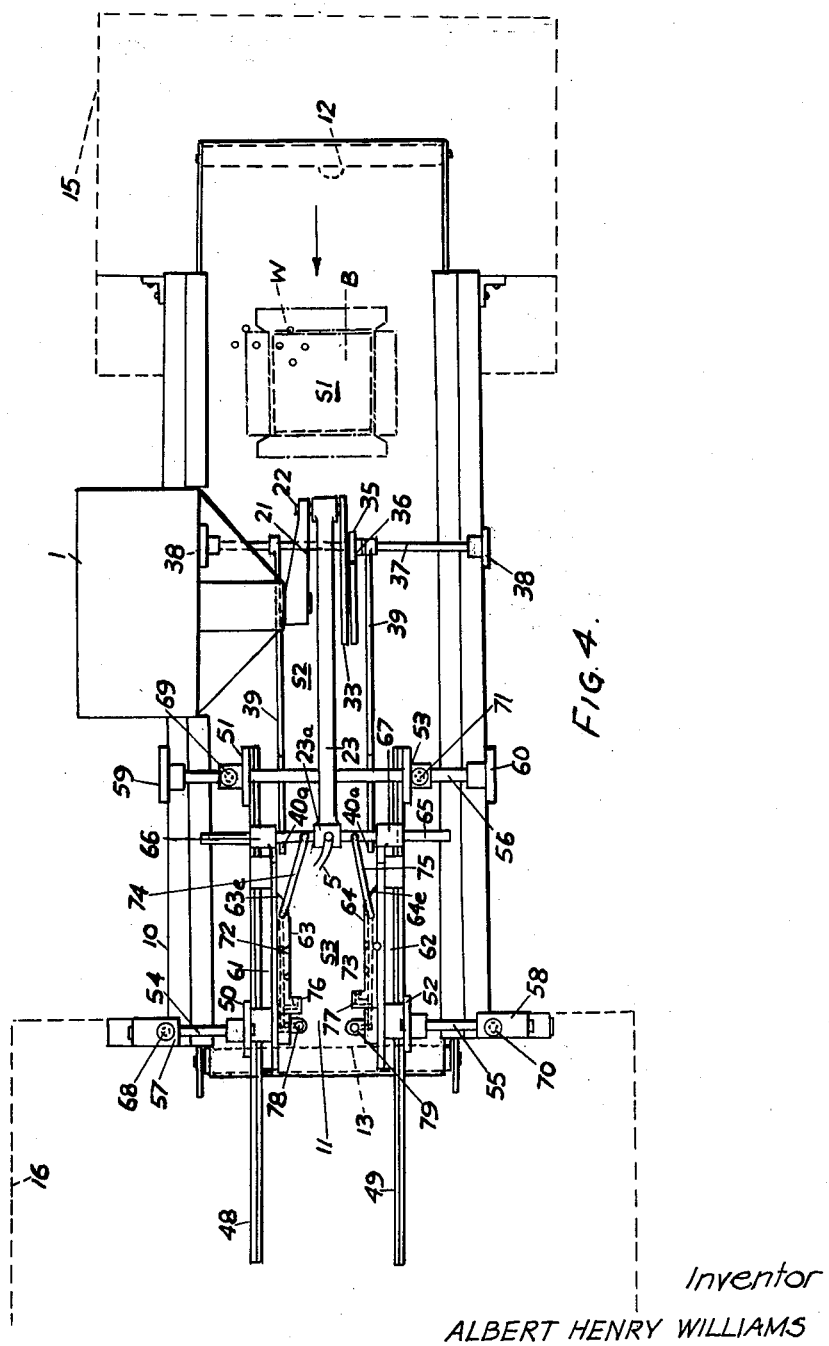
FIGURE 4 is a plan view of the apparatus.

Referring now to FIGURES 4 and 5 these show particularly the transfer mechanism 6.

Specifically there is provided a pair of horizontal slide bar guides 48, 49 which extend in the same longitudinal direction as and beyond the end of the conveyor 11 and are disposed on edge.

These slide bar guides 48, 49 are carried by four brackets 50, 51, 52, 53 which in turn are mounted on rods 54, 55 and 56. The rod 54 is mounted in a bracket 57, the rod 55 is mounted in a bracket 58, and the rod 56 is mounted in a pair of brackets 59 and 60, these brackets 57, 58, 59 and 60 being secured to the channel 10. Mounted to slide along the slide bar guides 48, 49 there are slides 61 and 62 each carrying transfer members in the form of a gripper jaw 63, 64 and being connected to a rod 65 by bearing brackets 66, 67 which project from the slides 61, 62.

The slide bar guides 48, 49 and consequently the jaws 63, 64 are adjustable transversely by displacement of the rods 54, 55 and their mountings 57 and 58, and by displacements of the brackets 51, 53 on the rod 56, there being provided releasable locking screws 68, 69, 70 and 71 for releasable locking of the parts in adjusted position.

The jaws 63 and 64 are also adjustable longitudinally and they are releasably locked in adjusted position by means of locking screws 72 and 73.

FIGURES 4 and 5 also show that the connecting rod 23 is connected to a bush 23a.

Fuller details of the gripping jaws and associated mechanism are shown in FIGURES 6 and 7.

Referring now to FIGURE 6 it will be seen how the slides 61 and 62 are mounted on the slide bar guides 48, 49 and how the jaws 63, 64 are releasably secured to the slides. The air pipe 5 leads to the bush 23a and communicates with the interior of the rod 65, which for the purpose is hollow, by means of a hole 23b. Two further holes 65a, 65b are provided in the wall of the hollow rod 65 and these communicate through pipes 74 and 75 with air passages 63a, 64a in the jaws 63, 64 (see also FIGURE 7).

From these air passages 63a, 64a there extends branch ducts 63c, 63d, 64c, 64d, which open in flared manner to the opposed faces of the jaws 63, 64 where the sides of a box will be located.

In addition there are provided ducts 76a, 77a leading to further ducts 76b, 77b which opens in a flared manner to the front side of blocks 76, 77 secured to the jaws 63, 64 where the front end of a box will be located.

There is further provided a pair of blocks 78, 79 projecting from the jaws 63, 64 in which there are formed ducts 78a, 79a branching from the passages 63a, 64a and which terminate in further ducts 78b, 79b which open in flared manner to the underside of the further blocks 78, 79 for picking up the front edge of the gummed sheet.

FIGURES 1, 3 and 5 also show that certain electrical mechanism may be mounted in association with the wrapping machine 16. This mechanism comprises a starter 41 (FIGURES 3, 5) which is connected to the limit switch LS1 (FIGURE 1) to be energised for starting a motor 42 (FIGURE 3), (by which an upper block 16c (FIGURE 1) and a lower block 16a of a form block are operated in known manner), and also connected to a limit switch LS3 (FIGURES 3, 5) to be de-energised for stopping the motor 42. This switch LS3 is one of a bank of limit switches LS3, LS4, LS5, and LS6 which are mounted for operation conveniently by cam bits 44 to 47 on a shaft 43 which can be any rotatable part in the wrapping machine which has one revolution per cycle of operations of the machine.

In FIGURE 1 mechanisms 80 and 81 are shown diagrammatically to represent drive control between the gumming machine 15 and the conveyor 11, and in FIGURE 13 there is shown the actual mechanism. More specifically the gumming machine 15 is of known type having gumming rollers one of which, indicated at 15a, is disposed adjacent the receiving end of the conveyor 11. An end spindle 11a of the conveyor 11 is adapted to be driven through a chain 11b, which travels on a sprocket wheel 11c, mounted on said spindle 11a, and a sprocket wheel 11d mounted on a spindle 11e. Also mounted on the spindle 11e, there is a sprocket wheel 11f connected by a chain 11g to a sprocket wheel 11h on a spindle 11i, on which said gumming roller 15a is mounted, and a pinion 11j on said spindle 11e is for driving another of the gumming rollers through a meshing gear 11k. The spindle 11e is further connected by chain 11l to another spindle 11m which is connected by sprocket wheel 11n and chain 11o to a sprocket wheel 11p driven by a motor 11q. The spindle 11m is further connected by pinion 11r to a gear 11s on a cam shaft 15b.

On the cam shaft 15b there is a cam 15c operable on a cam follower 15d to operate a link 15e connected to a wrapper feed device 15f of known form, and a cam 15g operable on a cam follower 15h to operate a link 15i connected to a clutch operating arm 15j operably engaged with a rotary clutch 15k on said spindle 11e to releasably connect drive from sprocket wheel 11f meshing with chain 11g to a sprocket wheel 11d on said spindle 11e and meshing with the chain 11b.

There is further mounted on cam shaft 15b a clutch similar to the clutch of FIGURE 2 and represented in FIGURE 13 by disc 15l having a shoulder 15m and carrying a latch 15n which is spring biased towards engagement with a notched clutch ring 15o and which cooperates with a clutch control arm 15p which is operable by a solenoid 8l.

Referring now to FIGURE 8 it will be seen that the limit switches LS1 and LS3 are separately connected to the starter 41.

The limit switch LS4 is connected to the solenoid 130 and also to the solenoid 130 and also to the solenoid 8l.

The limit switch LS5 is connected through relay R through the solenoid 5b and through the limit switch LS2.

The limit switch LS6 is connected to the solenoid 129. The limit switches LS3 to LS6 and the starter 41 are of course suitably connected to the mains, and the starter 41 is connected to the starter motor 42.

In the illustrated arrangement, wrappers W (FIGURES 1 and 4) would be gummed in the gumming machine and fed from it (in a manner to be described) gum side up on to the conveyor 11 at intervals, and the stayed box structure B would be placed by hand or automatic means one on each wrapper W in turn to form box assemblies at a loading station S1 the suction in the channel 10 maintaining the wrappers W flat on the belt 11.

Advance of the box assemblies by the conveyor 11 is in three stages (or more) starting at the loading station S1, (see particularly FIGURE 4) then moving to an intermediate station S2, and next moving to a transfer station S3.

The advance of each box assembly to the transfer station S3 is accomplished whilst the jaws 63, 64 are in fully advanced position feeding another box assembly to to the wrapping machine 16, the clutch 24—26 (FIGURE 2) being disengaged and the motor 17 (FIGURE 1) running continuously.

The fan 7 also runs continuously and the air valve 5a is set to open the air pipe 5 to atmosphere so that no suction is applied to the jaws 63, 64 (FIGURE 4) at this stage.

The motor 11q (FIGURE 13) of the gumming machine is continuously running to drive the gumming rollers (such as 15a) through the chains 11b, 11l, but both clutches 15k and 15l to 15o are disengaged so that there is no drive to the conveyor 11 or to the cam shaft 15b.

A cycle of operations is started by termination of the next previous cycle which results in the check arm 230 (FIGURE 2) dropping into a notch 25b of disc 25 thereby to close limit switch LS1 (FIGURE 1) for energising the starter 41 (FIGURE 3) to start the motor 42 which drives the shaft 43 with its cams 44 to 46.

Cam 45 operates to close limit switch LS4 whereby solenoid 8l (FIGURE 13) is energised to pull clutch arm 15p so that clutch 15l to 15o is engaged by clutch latch 15n releasing from clutch arm 15p and engaging clutch ring 15o, the result being that cam shaft 15b is driven by the continuously operating motor 11q. The cam 15c operates the wrapper feed device 15f whereby a wrapper W is fed to the gumming roller 15a and from there to the conveyor 11, in known manner, on which it becomes disposed flat with its gummed side uppermost. The cam 15g operates the clutch 15k to connect drive from the motor 11q to the conveyor 11 which then has a feed motion to carry the wrapper W to the loading station S1. This motion is terminated when cam shaft 15b completes a revolution whereupon the check arm 15q is actuated by the spring 15r to engage shoulder 15m of disc 15l; in addition, cam 45 (FIGURE 3) has passed limit switch LS4 which re-opens causing solenoid 8l (FIGURE 13) to de-energise and clutch arm 15p to return to re-engage clutch latch 15n and dis-engage the clutch 15l to 15c: furthermore the cams 15c and 15g allow return of the wrapping feed device 15f and release of clutch 15k ready for repeat operation.

Assuming that a stayed box structure B (FIGURE 4) is placed on to the wrapper W to form a box assembly and that the complete operation has been repeated to carry the box assembly from loading station S1 to intermediate station S2 while a new wrapper has been carried to the loading station S1 and a new stayed box structure has been placed on the latter wrapper, the next repeat operation causes advance of the two box assemblies from loading and intermediate stations S1, S2 to intermediate and transfer stations S2, S3 respectively, the foremost box assembly passing under the finger stop 40a. Next during operation of the wrapping machine 16, cam 47 (FIGURE 3) operates the limit switch LS6 which trips the solenoid 129 (FIGURE 1) and this pulls clutch control arm 27 (FIGURE 2) to clear its shoulder 27b from the clutch latch notch 26b so that the clutch latch springs into the nearest notch of the clutch ring 24 thereby clutching the crank mechanism 21 to 23 (FIGURE 4) to the motor 17 (FIGURE 1) which thereupon drives the crank mechanism 21, 23 (FIGURE 4) in appropriate direction through a first half of its movement for the jaws 63, 64 to be retracted to the transfer station S3.

Meanwhile the cam 34 rotates through a first half of its movement with the crank mechanism 21 to 23 to lower the finger stops 40a into stopping position behind the foremost box.

The last advance of the foremost box was to a location spaced a short distance forwardly of the finger stops 40a, and during the retraction of the jaws 63, 64 first their leading rounded or tapered edges 63e, 64e (FIGURES 4, 7) centralise the box and then the end blocks 76, 77 push the box into abutting engagement with the lowered finger stops 40a (FIGURE 4).

At this stage the clutch parts 24 to 26 (FIGURE 2) have completed a half revolution and the clutch control arm 28 is held by the spring 29 in clutch-dis-engaging position whereat its shoulder 28b trips out the clutch latch 26 and thereby de-clutches the crank mechanism 21 to 23 (FIGURE 1) from the motor 17.

The foremost box assembly is at this stage located in front of the finger stops 40a (FIGURE 4) between the jaws 63, 64 at the sides, and behind the end blocks 76, 77 and the jaws are originally adjusted to suit this condition according to the size of the box assembly to be dealt with.

At this stage the peg 25a (FIGURE 1) operates the switch LS2 which operates the relay R thereby releasing the solenoid 5b and allowing the air valve 5a to close to atmosphere and to open to pipe 5 (FIGURES 1 and 5) and the jaws 63, 64 (FIGURE 4), whereby suction is applied to all the passages in the jaws so that the box is gripped at the sides at 63c, 63d, 64c, 64d and front at 76b, 77b to the jaws and the front flap of the wrapper is held up at 78b, 79b.

Next during the operation of the wrapping machine the cam 45 (FIGURES 3 and 5) in the wrapping machine operates switch LS4 which causes operation of solenoid 8l (FIGURE 13) which through mechanism 80 operating as before, causes the next advance of the conveyor 11, while at the same time the switch LS4 (FIGURE 4) also causes solenoid 130 (FIGURE 1) to release the clutch control arm 28 thereby allowing the clutch 24 to 26 (FIGURE 2) to re-engage so that the crank mechanism 21 to 23 (FIGURE 4) then moves through the second half of its movement to advance the gripping jaws 63, 64 with the foremost box assembly carried by them by the suction.

It is to be noted that the suction is sufficient to grasp the box assemblies whether or not it is initially in contact with the jaws; indeed the suction may be effective for a distance of up to 3/16″ thereby to allow a tolerance of up to 3/8″ in the width of the box assembly, the jaws being originally adjusted to suit the largest oversize box assembly which might be expected in any given size of box assembly.

The jaws 63, 64 carry the foremost box assembly into the path of the form block in the wrapping machine 16 during which it will be noted that the movement, particularly of the wrapper W, is in the same direction as that of the top lap of the conveyor belt as will be understood by reference to FIGURE 4, and the front lap is held up and flat by the suction nozzles 78, 79 so that no crumpling of the wrapper can occur.

If at any other time there is no box on the wrapper the jaws' suction passages will not be blanked by the box so that the suction to the front flap will be ineffective and the wrapper will either not be delivered to the wrapping machine or will fall away off the end of the conveyor 11.

To allow for the advance of the foremost box assembly, the wrapping machine 16 has been stopped by its cam 44 (FIGURE 3) operating switch LS3 to de-energise the starter 41.

During this last advance of the foremost box assembly, conveyor 11 carries the second box assembly to the transfer station S3 (FIGURE 4), and the cam 34 rotates through the second half of its movement to raise the finger stops 40a clear of this second advancing box assembly.

When the advance of the two box assemblies is fully accomplished, the clutch control arm 27 (FIGURE 2), by the spring 29 presents its shoulder 27a to the clutch latch notch 26b thereby to disengage the clutch and de-clutch the crank mechanism 21 to 23 (FIGURE 4) from the motor 17 (FIGURE 1) thereby providing a dwell with the jaws advanced for operation of the wrapping machine.

At this stage the notch 25b (FIGURE 2) in the disc 25 registers with the end of the check arm 230 which drops into the notch 25b thereby to prevent gravitational backward movement of the crank mechanism 21 to 23. At the same time the check arm 230, by its drop, operates switch LS1 which energises the starter 41 to re-start the wrapping machine.

It is to be noted that starting of the wrapping machine is dependent on the advance of the jaws being to its fullest extent whereby the blocks 76, 77 on the jaws are positioned clear beyond the downward path of the upper box form 16c.

As soon as this upper box form 16c enters the stayed box structure, the cam 46 operates the switch LS5 which causes energising of the relay R and of the solenoid 5b, to open the air valve 5a which opens the air pipe 5 to atmosphere thereby relieving the suction to the jaws 63, 64.

The wrapping machine continues its operation in which the box assembly is carried downwardly out of the jaws 63, 64 until the cam 47 in the wrapping machine operates the switch LS6 which causes energising of the solenoid 129 to release the clutch control arm 27 thereby allowing the clutch to re-clutch the crank mechanism to the motor 17 to start the next cycle of operations.

It is to be understood that the apparatus may be modified in various ways within the scope of the appended claims. For example as already intimated the combined conveyor and transfer mechanism can be employed as a self-contained unit for use with, or built in with, any suitable construction of wrapping machine or gumming machine. Further the clutch control of the advancing jaws 63, 64 may be substituted by other means providing the required dwell, for example as shown in FIGURE 9, the axle 20 may be driven by a brake motor M through gearing G and, as shown particularly in FIGURE 10, there are only three limit switches LS3, LS4, LS5 with cams 44, 45, 46 on shaft 43 of the wrapping machine, the switch LS4 being connected to the brake motor M and being operable by two lobes L, L′ on the cam 45, and there being a disc D on axle 20 with two cam bits CB and CB1 to operate two further limit switches LS7 and LS8 also connected to the brake motor M. In operation of the arrangement, advance of the jaws 63, 64 is effected by one lobe L of cam 45 of the wrapping machine closing limit switch LS4 to start the brake motor M during operation of which disc D rotates and at the end of the forward stroke one cam bit CB opens limit switch LS7 to stop the brake motor; the brake motor is restarted, for return of the jaws, and after the necessary dwell, by the second lobe L1 of cam 45 of the wrapping machine closing the limit switch LS4 and it is stopped again at the end of the return stroke by the second cam bit CB1 on the disc D opening limit switch LS8.

In the further modification of FIGURES 11 and 12 an axle 20′ equivalent to axle 20 is conveniently at a low position and it is driven, again by a brake motor M through a drive connection DC, and on the axle 20′ there is a track disc cam TD operating a cam follower CF which is carried by a cam follower lever CFL pivoted at P and connected to the transfer mechanism 6; as best seen in FIGURE 12, there are again only three limit switches LS3, LS4, LS5 on shaft 43, cam 45 has only one lobe, disc D′ has only one cam bit and there is only one limit switch LS7 operable by this disc D′. In operation of this arrangement, the brake motor M′ is started by cam 45 closing limit switch LS4; the cam TD then rotates for full revolution during which a semicircular position SP of the cam track CT causes the jaws to have a dwell for operation of the wrapping machine. The jaws return by the cam TD and the brake motor is stopped by the cam disc D′ opening the limit switch LS7.

In any of the arrangements, operation of the apparatus can be under foot pedal control; for example, with reference to FIGURE 8, a foot pedal FP can be provided to operate a switch SW in the connection between the limit switch LS1 and starter 41 for the wrapping machine such that unless the foot pedal FP is pressed to close the switch SW to operate limit switch LS1 and starter 41, the wrapping machine cannot be started and of course, the combined conveyor and transfer mechanism cannot be started without the wrapping machine operating its switches LS4 and LS6. In another example (not illustrated) the foot pedal-operated switch can be alternatively provided such that the combined conveyor and transfer mechanism cannot be started until the foot pedal is pressed to close its switch, and of course the wrapping machine cannot be started without the combined conveyor and transfer mechanism operating.

What I claim is:

1. Apparatus for feeding box and wrapper assemblies, as to a form block wrapping machine, comprising in combination, a suction conveyor belt carrying spaced box assemblies thereon, each box assembly including a wrapper having a gummed upper surface and an open stayed box of less area than the wrapper disposed on the wrapper to leave wrapper flaps extending out from the sides of the box, means for moving said belt with spaced box assemblies thereon in a forward direction in spaced steps of moving and halting, each forward movement being through a distance equal to the spacing of box assemblies on the belt, reciprocatory transfer means for box assemblies movable over and along said belt from a transfer position where a box assembly is entrained to a forward position beyond the front end of the belt where the box assembly is discharged, said transfer means including entraining elements engageable with the box and other means for raising and holding up the leading edge flap of the wrapper, and means for moving said transfer means with an entrained box assembly forward from the transfer position on the belt during at least a part of the transfer movement while the belt is moving forward, and for returning the transfer means to the transfer position to entrain a box assembly while the belt is halted.

2. Apparatus as set forth in claim 1, further characterized by the fact that control means are provided for said belt moving means and said transfer moving means for starting the belt and transfer means in forward movement at approximately the same time.

3. Apparatus as set forth in claim 1, which further includes in combination, stop means disposed above said belt which occupies a position closely behind a box in the transfer position when the belt is halted, said transfer means moving back toward the front edge of the box when entraining it, and said stop means limiting the rearward movement of the box on the belt while being entrained by said transfer means.

4. Apparatus as set forth in claim 3, further characterized by the fact that said stop means includes operating means which moves the stop means clear of a box assembly as it moves forward on the belt into the transfer position and moving it into position behind the box assembly after it stops and prior to the time when said transfer means returns to entrain the box assembly.

5. Apparatus as set forth in claim 1, further characterized by the fact that said entraining elements comprise pneumatic devices acting upon the box and the front flap of the wrapper, and means controlling the application and release of the box and flap by said pneumatic devices.

6. Apparatus as set forth in claim 5, wherein the pneumatic devices for said box and flap include a common channel to a plurality of air ports for the box and flap, whereby the box and flap must both be present at said ports for either to be entrained.

7. Apparatus for feeding box and wrapper assemblies, as to a form block wrapping machine, comprising in combination, a conveyor belt carrying spaced box and wrapper assemblies thereon, reciprocatory transfer means movable above and along the length of said belt, said transfer means including transversely spaced members for engaging box assemblies at their sides, and support and guide means disposed above the belt for guiding said transfer means for movement along the length of the belt, said support and guide means providing separate lateral adjustment for said laterally spaced members for width and lateral position adjustment for different box sizes and for centering.

8. Apparatus as set forth in claim 7, in which said transversely spaced members are provided with tapered rear ends for centering box assemblies on the belt as they move back into position to entrain them.

9. Apparatus as set forth in claim 7, in which said transversely spaced members are provided with entraining means for the front of the box and for the leading edge flap of the wrapper.

10. Apparatus for feeding box and wrapper assemblies, as to a form block wrapping machine, comprising in combination, a conveyor belt carrying spaced box and wrapper assemblies thereon, reciprocatory transfer means movable above and along the length of said belt, said transfer means including transversely spaced laterally adjustable members for engaging the box assemblies at their sides, a transverse operating bar located above said belt to which said box engaging members are operably connected, and operating means connected to said transverse bar for reciprocating it and the box engaging members connected thereto.

11. Apparatus as set forth in claim 10, in which said operating means comprises cam operated levers and connecting rods at each side of the belt, and shaft operated cams below the level of the belt for operating said levers.

References Cited in the file of this patent
UNITED STATES PATENTS

| | | |
|---|---|---|
| 1,835,570 | Lorenz | Dec. 8, 1931 |
| 2,896,521 | Snyder | July 28, 1959 |
| 2,958,267 | Wolff et al. | Nov. 1, 1960 |
| 2,961,931 | Von Hofe | Nov. 29, 1960 |